(12) United States Patent
Holzlöhner et al.

(10) Patent No.: US 12,176,796 B2
(45) Date of Patent: Dec. 24, 2024

(54) DRIVE UNIT AND VEHICLE WITH A DRIVE UNIT

(71) Applicant: ZF Friedrichshafen AG, Friedrichshafen (DE)

(72) Inventors: Andreas Holzlöhner, Langenargen (DE); Vyacheslav Brushkivskyy, Kressbronn (DE); Marcel Neurohr, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/855,271

(22) Filed: Jun. 30, 2022

(65) Prior Publication Data
US 2023/0024850 A1    Jan. 26, 2023

(30) Foreign Application Priority Data
Jul. 20, 2021    (DE) ..................... 10 2021 207 731.5

(51) Int. Cl.
*H02K 9/19* (2006.01)
*B60K 1/00* (2006.01)
*H02K 5/20* (2006.01)

(52) U.S. Cl.
CPC .................. *H02K 9/19* (2013.01); *B60K 1/00* (2013.01); *H02K 5/20* (2013.01); *B60K 2001/003* (2013.01)

(58) Field of Classification Search
CPC ............... F16H 57/0476; F16H 57/027; F16H 57/0423; H02K 2205/09

USPC ........................................................ 74/421 A
See application file for complete search history.

(56) References Cited

U.S. PATENT DOCUMENTS

| | | | |
|---|---|---|---|
| 2,272,926 A | | 2/1942 | Squiller |
| 5,125,428 A | * | 6/1992 | Rauter .................... F01M 13/04 |
| | | | 210/188 |
| 5,522,769 A | * | 6/1996 | DeGuiseppi ......... H05K 5/0213 |
| | | | 454/270 |
| 6,092,812 A | * | 7/2000 | Ursel ....................... H02K 5/10 |
| | | | 277/630 |

(Continued)

FOREIGN PATENT DOCUMENTS

| | | |
|---|---|---|
| DE | 44 10 984 | 2/1995 |
| DE | 103 06 896 | 8/2004 |

(Continued)

OTHER PUBLICATIONS

German Patent Office, Office Action issued in German Patent Application No. 10 2021 207 729.3 (Mar. 28, 2022).

(Continued)

*Primary Examiner* — Jake Cook
(74) *Attorney, Agent, or Firm* — Finch & Maloney PLLC

(57) ABSTRACT

The present disclosure relates to a drive unit (1) with a housing (2) and an electric motor (3) arranged therein. A transmission (8) is coupled to the electric motor (3). At least one oil chamber (15) is arranged in the housing (2), the oil chamber(s) having an oil zone (21) and an air zone (22), where the air zone (22) is flow-connected by way of an inlet opening (36) to a venting channel (35) that leads to a vent (32) such that the inlet opening (36) is arranged in a central area (40) of the housing (2) of the drive unit (1).

11 Claims, 2 Drawing Sheets

(56) References Cited

U.S. PATENT DOCUMENTS

| | | | |
|---|---|---|---|
| 7,884,511 B2* | 2/2011 | Mogi | F16H 57/0476 |
| | | | 310/63 |
| 7,980,343 B2 | 7/2011 | Mogi | |
| 8,678,784 B2 | 3/2014 | Atarashi et al. | |
| 9,502,943 B2 | 11/2016 | Koeneman et al. | |
| 9,726,057 B2 | 8/2017 | Yamauchi | |
| 10,862,373 B2 | 12/2020 | Ishikawa et al. | |
| 11,137,061 B2 | 10/2021 | Ishikawa et al. | |
| 2002/0115521 A1* | 8/2002 | Thoma | B60K 17/105 |
| | | | 475/221 |
| 2006/0219037 A1 | 10/2006 | Inose et al. | |
| 2012/0312120 A1 | 12/2012 | Engelmann et al. | |
| 2019/0128179 A1 | 5/2019 | Kiyokami et al. | |
| 2019/0229582 A1 | 7/2019 | Ito et al. | |
| 2019/0249765 A1 | 8/2019 | Ito et al. | |
| 2019/0285168 A1 | 9/2019 | Ikeda et al. | |
| 2021/0376685 A1* | 12/2021 | Hacklberger | H02K 9/193 |

FOREIGN PATENT DOCUMENTS

| | | |
|---|---|---|
| DE | 11 2004 000 653 | 2/2006 |
| DE | 10 2009 018 786 | 10/2009 |
| DE | 11 2010 003 517 | 12/2012 |
| DE | 11 2017 003 983 | 5/2019 |
| DE | 11 2019 002 135 | 1/2021 |
| DE | 10 2019 122 617 | 2/2021 |
| EP | 2 504 608 | 10/2012 |
| EP | 2 831 469 | 2/2015 |
| JP | 2010-137829 | 6/2010 |
| JP | 2010-142090 | 6/2010 |
| WO | 2004/074704 | 9/2004 |
| WO | 2007/013642 | 2/2007 |
| WO | 2013/143809 | 10/2013 |
| WO | 2020/001794 | 1/2020 |

OTHER PUBLICATIONS

German Patent Office, Office Action issued in German Patent Application No. 10 2021 207 713.7 (Feb. 23, 2022).
German Patent Office, Office Action issued in German Patent Application No. 10 2021 207 731.5 (Mar. 17, 2022).
German Patent Office, Office Action issued in German Patent Application No. 10 2021 207 712.9 (Mar. 28, 2022).
United States Patent and Trademark Office, Office Action issued in U.S. Appl. No. 17/851,342 (Aug. 30, 2023).
United States Patent and Trademark Office, Non-Final Office Action issued in U.S. Appl. No. 17/846,792 (Jun. 13, 2024).

* cited by examiner

DRIVE UNIT AND VEHICLE WITH A DRIVE UNIT

RELATED APPLICATIONS

This application claims the benefit of and right of priority under 35 U.S.C. § 119 to German Patent Application no. 10 2021 207 731.5, filed Jul. 20, 2021, the contents of which are incorporated herein by reference in its entirety.

FIELD OF THE DISCLOSURE

The invention relates to a drive unit, in particular an electric drive for a vehicle with a transmission. In addition, the invention relates to a vehicle with a drive unit of this type.

BACKGROUND

Electric drive units with a transmission stage integrated in a housing are known from the prior art. These can be made with a wet-running or dry-running electric motor and are used in motor vehicles. To ensure reliable operation, the drive unit and the transmission stage have to be lubricated. For that purpose, oil from an oil reservoir is pumped through the drive unit by an oil pump.

SUMMARY

The oil reservoir can be divided into two oil chambers by a partition wall, these chambers being located near the axial ends of the rotor shaft in order there to pick up the oil from actively lubricated bearings. The two oil chambers are separated from one another by a partition wall, which has an overflow channel so that oil can flow from one oil chamber into the adjacent one. By having two oil chambers, when the drive unit is in an inclined position, for example when driving up or down an incline, not all of the oil flows to one end and the movement of the oil is reduced by the partition wall by comparison with a large oil chamber. Usually co-rotating components are located at the two ends of the rotor shaft, but if an excessive amount of oil is present in the associated oil chamber these components pick up too much oil and convey it to the upper parts of the oil chambers, which is undesirable. Furthermore, if much more oil is present in one oil chamber than in the adjacent one, oil can splash across abruptly through the overflow channel into the empty oil chamber and there penetrate to areas that should not come into contact with oil, or with too much oil. Such areas then have to be sealed off, with increased cost and complexity.

For each oil chamber such drive units comprise vents in order to enable venting to the outside, so that if there are very different oil levels or very marked temperature changes in the chambers, the pressure in the air zone is not allowed to become too high or too low, since this would at least make it more difficult to pump oil out of one of the oil chambers.

A disadvantage of such drive units is that venting to the outside through vents provided for the purpose can be prevented or at least made more difficult by oil sprayed around by rotating parts of the drive unit.

The purpose of the present invention is to provide an electric drive unit with a transmission stage integrated in a housing, and with improved venting.

This objective is achieved by a drive unit with a housing, and electric motor arranged therein, a transmission coupled to the electric motor and at least one oil chamber arranged in the housing, the said oil chamber having an oil zone and an air zone. The air zone is flow-connected to a venting channel by way of at least one inlet opening. Thus, a transition between the oil chamber and the venting channel is formed by the at least one inlet opening. The venting channel leads to a vent of the oil chamber. The vent leads out to the open air. It is provided that the at least one inlet opening in flow-connection with the venting channel is arranged in a central area of the housing of the drive unit.

Thanks to the arrangement of the at least one inlet opening in a central area of the housing of the drive unit, oil is prevented from being sprayed into the inlet opening by the rotating rotor shaft of the electric motor or by components arranged on it, and thereby blocking the inlet opening. Rather, in any operating conditions of the drive unit the inlet opening remains free from oil, so that, venting of the oil chamber is ensured.

If the inlet opening in the housing of the drive unit is located too far toward the outside, for example in an area of an outer periphery of a component that is arranged on the rotor shaft and that rotates with it, it can happen that due to the component arranged on the rotor shaft oil is sprayed into the inlet opening and blocks it. Then a pressure equalization can only take place by flow-back to a limited extent, whereby at each pressure equalization a variable air pressure is produced in the oil zone. Moreover, this can result in the escape of oil out of the vent. Accordingly, it is provided that the inlet opening is formed in the housing of the drive unit radially inside an outer periphery of any component arranged on the rotor shaft and co-rotating with it. The component arranged on the rotor shaft and co-rotating with it can for example be in the form of an impulse ring that serves for the measurement of rotation speed.

The inlet opening can be positioned in the housing of the drive unit adjacent to the rotor shaft mounted in the housing, or adjacent to a bearing for mounting the rotor shaft in the housing of the drive unit. This makes it possible to position the inlet opening as close to the center in the housing of the drive unit.

Relative to the installation position of the drive unit, the inlet opening can be arranged above a rotation axis of the rotor shaft. In that way the inlet opening is even farther away from oil in the oil zone of the oil chamber, and the venting channel can be made shorter.

It can also be provided that the inlet opening is designed such that its aperture is directed away from a spray direction of oil when the rotor shaft rotates. This prevents oil from being sprayed directly through the inlet opening into the venting channel.

In a design of the invention it is provided that the at least one inlet opening is shielded against the entry of oil from the oil chamber by a mechanical screen. The said screen can, for example, be in the form of a membrane permeable to air but impermeable to oil, or of a screen wall in the oil chamber. The screen wall can for example be designed in a labyrinthine manner. Thus, penetration of oil into the inlet opening is prevented by simple means.

According to a further design of the invention it is provided that at least one further inlet opening is arranged in the central area of the housing of the drive unit. The air zone of the oil chamber is also flow-connected to the venting channel by way of this further inlet opening. A transition between the oil chamber and the venting channel is thus also formed by this further inlet opening. Preferably, the two inlet openings provided in the central area of the housing of the drive unit are positioned offset relative to one another, so that venting of the oil chamber is ensured regardless of the rotation direction of the rotor shaft of the drive unit.

It is provided that the at least one inlet opening flow-connected to the venting channel is arranged in a central area of the housing of the drive unit.

The drive unit can preferably be designed in such manner that it has at least one further oil chamber arranged in the housing. This further oil chamber too has an oil zone and an air zone, and the oil zones of the two oil chambers are flow-connected to one another by an overflow channel and the air zones of the two oil chambers are flow-connected to one another by a pressure equalization channel. In that way pressure equalization of the two oil chambers is ensured in any installation position and driving situation. In the two oil chambers the pressure is always the same, so that only venting in one of the two oil chambers is needed. The oil zones of the two oil chambers can be provided at opposite axial end areas of the electric motor. In that way the oil zones can be integrated as simply as possible in the housing of the electric drive unit and the oil zones are close to the points to which the oil is delivered and from which oil flows back to the bottom of the oil chamber.

The drive unit comprises a pump, the suction side of which is flow-connected to an oil zone and which delivers oil through the oil chambers. The pump delivers oil to bearings of a rotor shaft and/or a transmission and/or gearwheels of the transmission. Thus, only or preferentially those points of the drive unit are supplied with oil, which have to be actively lubricated.

Preferably, the rotor shaft is in the form of a hollow shaft. In that way oil from an oil chamber near the bearing is delivered to the bearings in the other oil chamber. From the hollow shaft the oil can easily be deflected toward the bearings and/or gearwheels.

Preferably, the electric motor is arranged in a motor space separated from the oil chambers. This allows a dry-running electric motor to be used.

The proposed drive unit serves to electrically drive a vehicle. Correspondingly, the drive unit comprises an electric motor for providing drive power for the vehicle. The vehicle can for example be in the form of a passenger car or a utility vehicle. The utility vehicle can for example be a truck, a small van or a bus.

BRIEF DESCRIPTION OF THE DRAWINGS

Further features and advantages of the invention emerge from the following description of preferred embodiments, with reference to the figures, which show.

DETAILED DESCRIPTION

Figure 1:
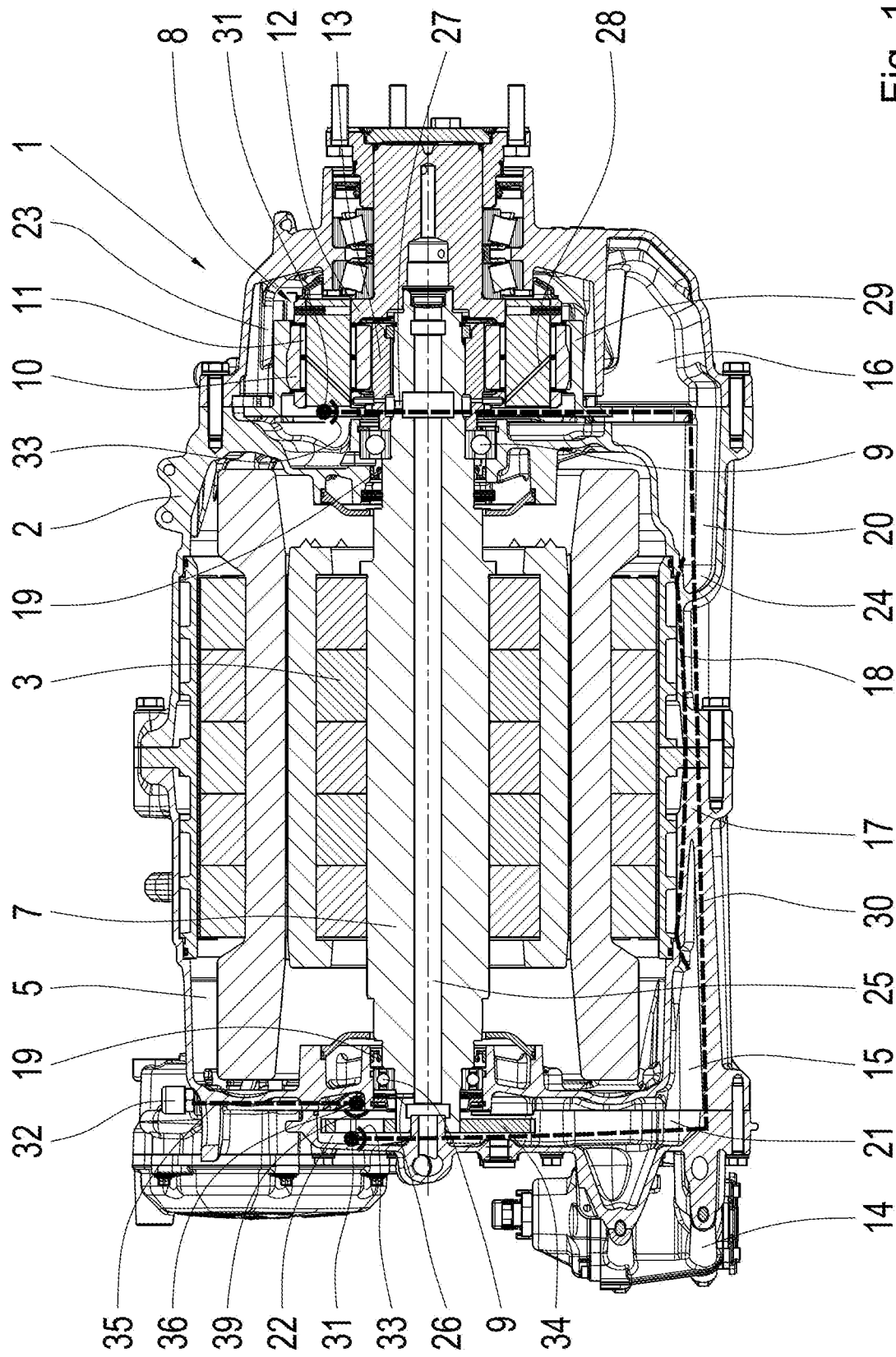
FIG. 1: A sectioned view of an embodiment of the drive unit according to the invention, in which an inlet opening in flow connection with a venting channel is arranged in a central area of the housing of the drive unit.

FIG. 1 shows a drive unit 1 according to the invention with a housing 2 and an electric motor 3 in a partitioned and sealed motor space 5 arranged in the housing 2. The electric motor 3 can for example be an asynchronous motor with a stator and a rotor.

In the example embodiment shown, the rotor shaft 7 is in the form of a hollow shaft. Coupled to the rotor shaft 7 is a transmission 8, which in this case is in the form of a planetary transmission. However, other types of electric motors and transmissions can also be used in the drive unit 1.

The rotor shaft 7 is supported in the housing by means of bearings 9. In the example embodiment shown, the bearings 9 are in the form of ball bearings.

The planetary wheels 10 of the transmission 8 are supported by bearings 11 on a planetary carrier 12. In contrast, in this example embodiment the bearings 11 of the planetary wheels 10 are in the form of needle bearings.

The rotor shaft 7 can be driven by the electric motor 3 and in the embodiment shown transmits the torque to a sun gear 13 of the transmission 8. The drive output takes place by way of the planetary carrier 12.

A pump 14 is arranged on the outside of the housing 2. This pump 14 is an oil pump.

Two oil chambers 15, 16 are arranged in the housing 2. However, depending on the drive unit there may also be more than two oil chambers. These oil chambers 15, 16 are separated from one another by a partition wall 17 and are flow-connected with one another by an overflow channel 18, here represented symbolically. Furthermore, the oil chambers 15, 16 are separated from the motor space 5 of the electric motor 3 by seals 19.

In this case the oil chambers 15, 16 are located in the axial end areas of the electric motor 3, where the bearings 9, 11 and the transmission 8 are also arranged. The overflow channel 18 forms a flow connection between the oil chambers 15, 16.

In each case, in the assembled condition the oil chambers 15, 16 have respective oil zones 20 and 21 at the bottom and air zones 22, 23 above them.

In the assembled condition, owing to a slightly oblique position of the drive unit 1 in the vehicle the oil zone 20 of the oil chamber 16 is approximately vertically under the oil chamber 15 and therefore has the function of a primary oil reservoir.

In the example embodiment shown, the pump 14 draws oil out of this oil zone 20 of the oil chamber 16 by way of a dedicated suction channel 24 that begins in the oil chamber 16. The suction channel 24 is a separate channel a distance away from the overflow channel 18 and leads to the pump 14 directly alongside the oil, chamber 15.

The pump 14 delivers the oil into a channel 25 inside the rotor shaft 7, which the latter is for that purpose made as a hollow shaft. The two oil chambers 15, 16 are additionally connected with one another by way of this channel 25.

From the channel 25 an opening 26 leads to the bearing 9 in the oil chamber 15, so that oil is delivered to the appropriate bearing and lubricates and cools it. Oil flowing out of the bearing, 9 is then already in the oil chamber 15 and can flow into its oil zone 21.

At the opposite end of the rotor shaft 7 a further opening 27 is provided, through which oil can flow on the one hand to the bearing 9 in the oil chamber 16 and on the other hand to the planetary wheels 10 and thus also to the sun gear 13 and, via openings 28, to the bearings 11 of the planetary wheels 10. The teeth meshing with a ring gear 29 of the planetary transmission are also lubricated thereby.

In this case too, the oil in the oil chamber 16 can flow down into the oil zone 20. From there it is again drawn off by the pump 14, so that a circuit is produced.

In the embodiment shown in FIG. 1 a pressure equalization channel 30 is provided, which forms a flow connection between the air zones 22, 23 of the two oil chambers 15, 16. The pressure equalization channel 30 is shown as a broken line and extends completely inside the housing 2, and can in this case be in the form of a tube or flexible pipe. If necessary, the tube or pipe can pass through the overflow channel 18 without restricting its cross-section too much.

The ends and therefore outlet points 31 of the pressure equalization channel 30 open into the air zones 22, 23 of the oil chambers 15, 16 and thus ensure pressure equalization between the oil chambers 15, 16. The outlet points 31 of the pressure equalization channel 30 are provided with a symbolically represented mechanical screen 33, which prevents the oil from making its way into the pressure equalization channel 30. The mechanical screen can, for example, be in the form of a membrane which is permeable to air but impermeable to oil. Such a membrane can be arranged at the ends of the pressure equalization channel 30. Thus, air can enter the pressure equalization channel 30 and ensure pressure equalization, but oil is held back by the membrane.

It is also conceivable to make the mechanical screening 33 in the form of a labyrinth-type screen wall. Such a screen wall can for example be arranged directly at the outlet points 31 of the pressure equalization channel 30 or it can be part of the wall of the housing 2. The labyrinth structure prevents oil from getting into the pressure equalization channel 30, whereas air can pass through such a labyrinth screen and thus ensure pressure equalization between the oil chambers 15, 16.

If such a pressure equalization channel 30 is used, vents do not have to be provided for both oil chambers 15, 16. It is sufficient for one of the two oil chambers 15, 16 to be provided with a vent 32. In this case the vent 32 is flow-connected to the corresponding oil chamber 15 via a venting channel 35 which opens into an inlet opening 36 in one of the air zones 22. The venting channel 35 can be formed in the housing 2 of the drive unit 1. The vent 32 leads to the open air.

Thus, a transition is formed between the air zone 22 of the oil chamber 15 and the venting channel 35 by way of the at least one inlet opening 36. It is provided that the at least one inlet opening 36 flow-connected to the venting channel 35 is arranged in a central area of the housing 2 of the drive unit 1.

The inlet opening 36 of the venting channel 35 is provided in the housing 2 of the drive unit 1 radially inside an outer periphery of the impulse ring 34 arranged on the rotor shaft 7. Moreover, the inlet opening 36 is arranged adjacent to the rotor shaft 7 mounted in the housing 2 or adjacent to the bearing 9 that supports the rotor shaft 7 in the housing 2 of the drive unit 1. This enables the inlet opening 36 to be positioned as close as possible to the center in the housing 2 of the drive unit 1.

The positioning of the at least one inlet opening 36 in a central area of the housing 2 of the drive unit 1 avoids the spraying of oil, during the rotation of the rotor shaft 7, into the inlet opening 36 by an impulse ring 34 arranged on the rotor shaft 7, and thereby blocking the said opening. Rather, the inlet opening 36 remains free from oil, thus ensuring the veining of the oil chambers 15, 16.

The inlet opening 36 of the venting channel 35 is provided with a symbolically represented mechanical screen 39, which prevents the oil from making its way into the venting channel 35. The mechanical screen 39 can for example be in the form of a membrane permeable to air but impermeable to oil. Such a membrane can, for example, be arranged at the end of the venting channel 35. Thus, air can get through the venting channel 35 and ensure venting or aeration of the oil chamber 15, but oil is held back by the membrane.

It is also conceivable that the mechanical screen 39 is made as a labyrinth-type screen wall. Such a screen wall can for example be arranged directly over the inlet opening 36 of the venting channel 35, or can be part of the wall of the housing 2. The labyrinthine structure prevents oil from getting into the venting channel 35, whereas air can pass through such a labyrinthine screen and so ensure venting or aeration of the oil chamber 15.

Figure 2:
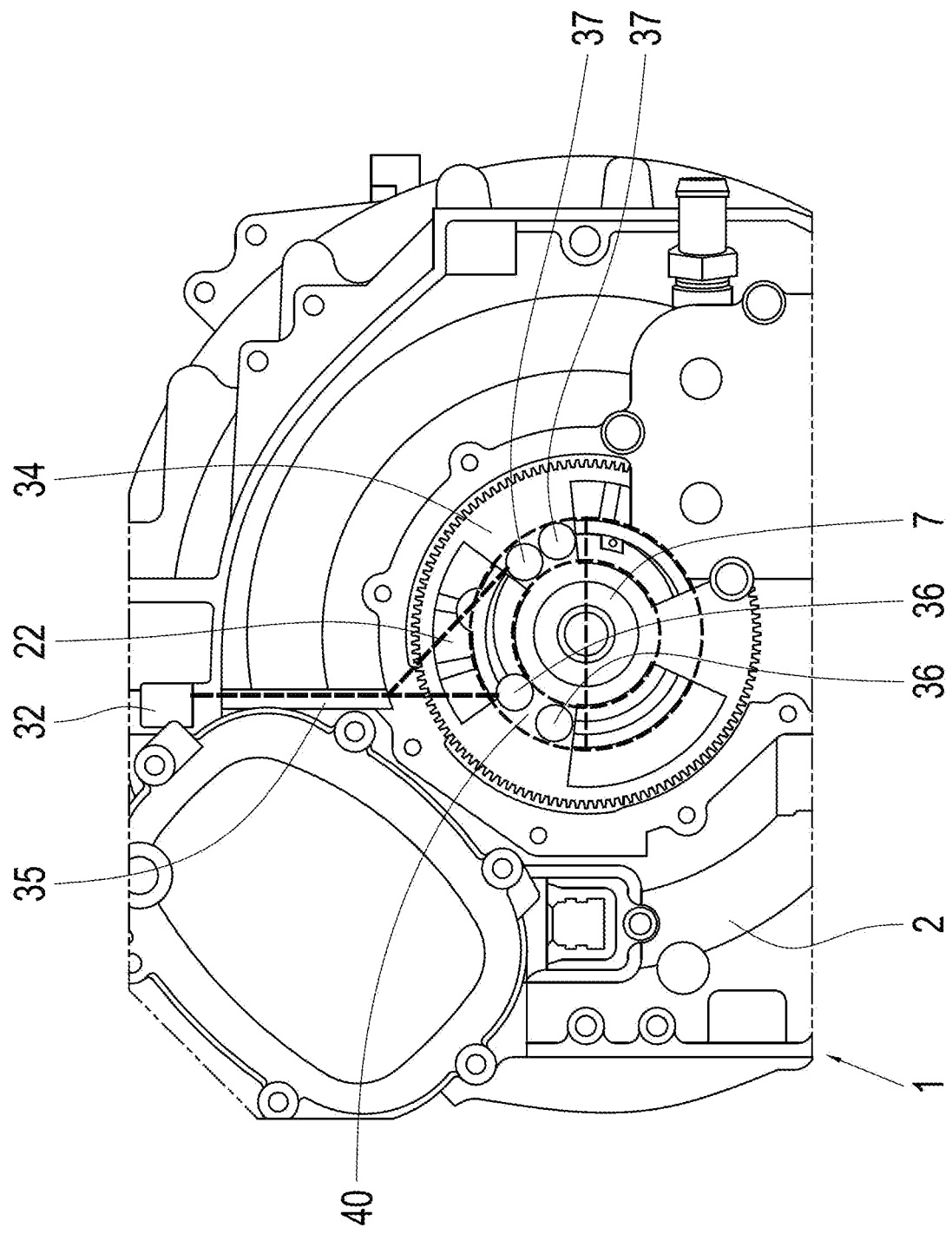
FIG. 2: A front view of an embodiment of the drive unit according to the invention, in which a number of possibilities for the location of the inlet opening of the vent are shown.

In the embodiment shown in FIG. 2 the inlet opening 36, which is in flow connection with the vent 32 by way of the venting channel 35, is positioned in a central area 40 of the housing 2. In this case the inlet opening 36 connects the air zone 22 of the oil chamber 15 via the venting channel 35 to the vent 32, in order to ensure venting and aeration of the oil chamber 15. In these examples several possible positions for the inlet opening 36 are shown. Furthermore, for the sake of greater visibility a cover positioned laterally on the housing 2 is not shown.

In this case the central area 40 is indicated by two concentric broken circles and is essentially formed by the annular area between them, in which the inlet opening 36 can be positioned as close as possible to the center of the housing 2 and away from the outer edge of an impulse ring 34 that serves for the measurement of rotation speed. Toward the center the said central area 40 is delimited by the rotor shaft 7 and the associated bearing 9.

The inlet opening 36 is preferably located in the upper half of the central area 40 since in the lower area, depending on the operating condition, oil may be present. Accordingly; the venting channel 35 can then be made shorter.

Location of the inlet opening 36 at the indicated points in the central area 40 has the advantage that in those positions the inlet opening 36 can be blocked by oil only with difficulty, since the impulse ring 34 will spray the oil outward. The oil then collects on the cover (not shown here) and runs back down into the oil zone 21.

Furthermore, the inlet opening 36 can be designed such that the aperture of the inlet opening 36 is directed away from the oil-spraying action of the impulse ring 34, so that the oil cannot be sprayed directly through the inlet opening 36 into the venting channel 35.

In FIG. 2, in addition to the at least one inlet opening 36 at least one further inlet opening 37 is shown. This further inlet opening 37 is also located in the central area 40 of the housing 2 of the drive unit 1. In that way, the air zone 22 of the oil chamber 15 is flow-connected to the venting channel 35 by way of this further inlet opening 37 as well. A transition between the air zone 22 and the venting channel 35 is therefore also formed by the said further inlet opening 37. Like the inlet opening 36, so too the inlet opening 37 can be provided with a mechanical screen that prevents oil from making its way into the venting channel 15. In the central area 40 the two inlet openings 36, 37 are arranged offset relative to one another. In the central area 40, in the assembled condition of the drive unit 1 the first inlet opening 36 can be arranged in an area preferably between nine and eleven o'clock, whereas the second inlet opening 37 is arranged in an area between one and three o'clock. In FIG. 2, as examples two possible positions for the inlet opening 36 and two possible positions for the inlet opening 37 are shown. In that way, the venting of the oil chamber 15 is ensured regardless of the rotation direction of the rotor shaft 7 of the electric motor 3. If the rotor shaft 7 is rotating clockwise, venting of the oil chamber 15 can be ensured through the inlet opening 37 which is positioned away from the oil spraying action. If the rotor shaft 7 is rotating in the counter-clockwise direction, then in contrast the venting of the oil chamber 15 is ensured through the inlet opening 36. Thus, venting of the oil chamber 15 is ensured even if sprayed oil should get through the rotating rotor shaft 7 to the central area 40. Accordingly, venting is independent of the travel direction of the vehicle propelled by the drive unit 1.

INDEXES

1 Drive unit
2 Housing
3 Electric motor
5 Motor space
7 Rotor shaft
8 Transmission
9 Bearing
10 Planetary wheels
11 Bearing
12 Planetary carrier
13 Sun gear
14 Pump
15 Oil chamber
16 Oil chamber
17 Partition wall
18 Overflow channel
19 Seals
20 Oil zone
21 Oil zone
22 Air zones
23 Air zone
24 Suction channel
25 Channel
26 Opening
27 Opening
28 Openings
29 Ring gear
30 Pressure equalization channel
31 Outlet points
32 Vent
33 Screen
34 Impulse ring
35 Venting channel
36 Inlet opening
37 Inlet opening
39 Screen
40 Central area

The invention claimed is:

1. A drive unit comprising:
a housing;
an electric motor arranged in the housing, the electric motor having a rotor shaft and one or more components on the rotor shaft and co-rotating with the rotor shaft;
a transmission coupled to the electric motor; and
at least one oil chamber arranged in the housing, the at least one oil chamber comprising an oil zone and an air zone,
wherein the air zone is flow-connected to a venting channel by way of at least one inlet opening, wherein the venting channel extends to a vent and the at least one inlet opening is arranged in the housing radially inside of an outer periphery of all of the one or more components on the rotor shaft and co-rotating with the rotor shaft.

2. The drive unit according to claim 1, wherein the at least one inlet opening is adjacent to the rotor shaft.

3. The drive unit according to claim 2, wherein in an assembled condition of the drive unit, the at least one inlet opening is arranged above a rotation axis of the rotor shaft.

4. The drive unit according to claim 1, wherein an aperture of the at least one inlet opening is directed in a direction opposite to a spray direction of oil.

5. The drive unit according to claim 1, wherein the drive unit comprises at least one further oil chamber arranged in the housing, the at least one further oil chamber comprising an oil zone and an air zone, wherein the oil zone of the at least further oil chamber and each oil zone of the at least one oil chamber are flow-connected by an overflow channel and the air zone of the at least one further oil chamber and the air zone of the at least one oil chamber are flow-connected by a pressure equalization channel.

6. The drive unit according to claim 5, wherein the oil zones are provided at opposite axial end areas of the electric motor.

7. The drive unit according to claim 1, wherein the at least one inlet opening is protected against the entry of oil from the oil chamber by a mechanical screen.

8. The drive unit according to claim 7, wherein the mechanical screen is in the form of a membrane permeable to air but impermeable to oil.

9. The drive unit according to claim 7, wherein the mechanical screen is in the form of a screen wall in the oil chamber, the screen wall defining a labyrinth.

10. The drive unit according to claim 1, wherein the central area of the housing of the drive unit, defines at least one further inlet opening which is axially offset relative to the first inlet opening.

11. A vehicle comprising a drive unit according to claim 1.

* * * * *